US005720386A

United States Patent [19]
Allsop et al.

[11] Patent Number: 5,720,386
[45] Date of Patent: Feb. 24, 1998

[54] STORAGE CONTAINER FOR A DISK-SHAPED RECORDING MEDIUM

[75] Inventors: James D. Allsop; Charles D. Highlander, both of Bellingham; Walter A. McCormick, Lynden, all of Wash.

[73] Assignee: Allsop, Inc., Bellingham, Wash.

[21] Appl. No.: 705,331

[22] Filed: Aug. 29, 1996

[51] Int. Cl.[6] ................................................ B65D 85/57
[52] U.S. Cl. ...................... 206/308.1; 206/310; 206/313
[58] Field of Search ........................................ 206/307, 309, 206/310, 311, 312, 313, 308.1, 232

[56] References Cited

U.S. PATENT DOCUMENTS

| | | |
|---|---|---|
| 1,554,995 | 9/1925 | Fetters . |
| 3,042,469 | 7/1962 | Lowther . |
| 4,630,732 | 12/1986 | Snyman . |
| 4,647,118 | 3/1987 | Kamperman . |
| 4,664,454 | 5/1987 | Schatteman et al. . |
| 4,770,474 | 9/1988 | Ackeret . |
| 4,780,868 | 10/1988 | Vignal . |
| 4,793,480 | 12/1988 | Gelardi et al. . |
| 4,875,743 | 10/1989 | Gelardi et al. . |
| 5,011,010 | 4/1991 | Francis et al. . |
| 5,042,655 | 8/1991 | Beldyk et al. ............... 206/454 X |
| 5,099,995 | 3/1992 | Karakane et al. . |
| 5,135,106 | 8/1992 | Morrone ........................ 206/308.1 |
| 5,150,354 | 9/1992 | Iwata et al. . |
| 5,244,084 | 9/1993 | Chan . |
| 5,425,450 | 6/1995 | Lin . |
| 5,425,451 | 6/1995 | Blase . |

FOREIGN PATENT DOCUMENTS

WO 94/25376  11/1994  WIPO .

*Primary Examiner*—Jacob K. Ackun
*Attorney, Agent, or Firm*—Christensen O'Connor Johnson & Kindness PLLC

[57] ABSTRACT

A storage container (10) for a compact disk. The storage container (10) includes an outer casing (11) in which is received a compact disk (C). The storage container (10) includes a compact disk support in the form of a pair of arms (12a, 12b) which grasp the compact disk (C) and suspend the compact disk (C) in the storage container (10). A rotatable sidewall (14) is rotatably mounted to the outer casing (11). Rotation of the rotatable sidewall (14) removes the compact disk (C) from within the outer casing (11). Further rotation of the rotatable sidewall (14) causes the rotatable sidewall (14) to act as a lever arm and to press the arms (12a, 12b) together, releasing the compact disk (C).

28 Claims, 5 Drawing Sheets

STORAGE CONTAINER FOR A DISK-SHAPED RECORDING MEDIUM

FIELD OF THE INVENTION

This invention relates to a container for a recording medium and, more particularly, to a storage container for a compact disk which permits removal and retrieval of the compact disk from the storage container without touching the compact disk.

BACKGROUND OF THE INVENTION

Current standard storage containers for compact disks include a tray for receiving the compact disk. The compact disk and the tray are encased within an outer casing. The outer casing includes a rectangular base and a rectangular cover pivotally connected to the base. The tray is fixed within the base and includes a circular recess for receiving the compact disk. A number of tray retention fingers extend outwardly from the center of the circular recess. A central aperture of the compact disk snaps onto the tray retention fingers and is held in place by an interference fit. A small projection, or rib, is usually formed on the side walls of the base for matching with the cover and to keep the container closed.

To release the compact disk from these conventional storage containers, one must pry open the cover, press downward on the tray retention fingers with the index finger, and simultaneously fit the thumb and middle finger on opposite outer edges of the compact disk and pull the compact disk away from the tray against the resistance of the tray retention fingers. Resetting the compact disk on the tray requires pressing down on the top of the compact disk with the user's fingers until the central aperture of the compact disk overcomes the resistance of the retention fingers and is snapped into place.

The conventional compact disk storage container described above presents many disadvantages. For example, the rib on the base causes separation of the cover from the base to be difficult, often resulting in cracking or breaking of the cover. In addition, the rib often quickly breaks or wears away, causing the storage container to be undesirably open.

Removal of the compact disk from the retention fingers on the tray is difficult, and requires coordinated use of three fingers of one hand. In addition, the pressure applied by a user when removing and replacing the compact disk places a strain on the compact disk and the container. This strain can result in damage to the compact disk or breakage of the container.

Most importantly, conventional compact disk storage containers present the disadvantage that the disk must be handled by a user to remove the compact disk from and reattach the compact disk to the storage container. By handling disks, the user presents a situation in which din, dust, and oil on the hands of the user may contaminate the reading surface of the compact disk. This dirt or oil may make reading of the compact disk difficult by the compact disk player.

A number of prior designs for compact disk storage containers have addressed some of the above concerns by providing containers which facilitate removal of the compact disk. For example, U.S. Pat. No. 4,493,417 to Ackeret discloses a storage container for cassettes, records, or compact disks. The storage container includes a drawer with an internal tray that tilts upwardly as the drawer is pulled from the outer casing. A leaf spring biases the tray upwardly from the drawer itself such that the recording media can be easily grasped and removed from the tray.

U.S. Pat. No. 4,793,480 to Gelardi et al. discloses a storage container for a compact disk. The storage container includes a tilt tray mechanism. One embodiment disclosed in the Gelardi patent includes a leaf spring that raises the tray for the compact disk away from the base of the container as the cover is opened.

U.S. Pat. No. 5,425,450 to Lin discloses a compact disk carrying case in which the compact disk is connected to a rotatable lid by a structure that has retention fingers that extend into the central aperture of the compact disk. The lid and the compact disk are rotated outward so that the compact disk is extended out of the container, and the compact disk is pulled away from the retaining fingers to remove the compact disk from the storage container.

Although the containers described above are reliable for storage purposes and present effective methods of presenting a compact disk so that a user may remove the compact disk from a storage container, the containers still require handling of the compact disk by a user to remove the compact disk from or replace the compact disk in the container. In addition, the containers include retention fingers or similar hubs against which the compact disk must be pulled to remove the compact disk from the container. The compact disk must also be pressed onto the hub or retention fingers to return the compact disk to the containers, creating another situation in which strain is applied to the storage container and the hands of the user must directly contact the compact disk. There is a need in the art for a more convenient way of storing a compact disk in a container which permits easy removal and reattachment of the compact disk. Preferably, such a storage container will allow hands-free removal and replacement of the compact disk.

SUMMARY OF THE INVENTION

The present invention provides a compact disk storage container. The storage container solves many of the above-listed problems by providing hands-free removal and retrieval of the compact disk from the container. The container includes a pair of arms rotatably attached to an upper lid of the container. The arms each include flanges which extend into the central aperture of a compact disk. The arms are biased, or pressed outwardly to hold, the compact disk in place. By rotating a rotatable sidewall relative to the compact disk container, the compact disk is moved outwardly from the outer casing of the container. By continuing this rotation, one of the arms engages a stop and the other is engaged by a portion of the rotatable sidewall. Continued rotation of the rotatable sidewall causes the arms to be pressed together such that the flanges are released from the central aperture of the compact disk. The compact disk will then slide off of the flanges.

The storage container may be manipulated during this releasing action in such a way that upon release of the compact disk from the flanges, the compact disk will drop onto the compact disk receiving surface of a compact disk player. To remove the compact disk from the compact disk playing surface and replace the compact disk in the container, the procedure is reversed. In this manner, a user may remove and replace a compact disk from the storage container without having to handle the compact disk.

More particularly described, the present invention provides a storage container for a compact disk. The storage container includes an outer casing and a grasping mechanism operatively connected to the outer casing. The outer casing and the grasping mechanism are configurable between a first position in which a compact disk held by the grasping mechanism is located within the outer casing and a second position in which the grasping mechanism is aligned such that a compact disk held by the grasping mechanism is substantially outside the outer casing. The grasping mechanism includes a first arm configured to engage a first location on the compact disk and a second arm configured to engage a second location on the compact disk, the second location spaced from the first location. The first and second arms are pressed toward the first and second locations such that when a compact disk is held by the grasping mechanism, the first and second arms hold the compact disk in place. The first and second arms are arranged such that a user may manipulate the arms against the pressure of the arms toward the first and second locations so that the compact disk may be released.

Preferably, the first and second locations are located on the central aperture of the compact disk. If the first and second locations are located on opposite internal edges of the central aperture, the first and second arms are configured such that they are pressed outwardly to engage the opposite internal edges. The first arm may have a first flange, and the second arm may have a second flange, the first and second flanges set to engage the opposite internal edges. The flanges may be rounded to permit easy retrieval of the compact disk on the grasping mechanism. The first and second arms may also have lips that extend underneath a compact disk held by the grasping mechanism, or a stabilization arm extending off of one of the first and second arms located such as to limit upward movement of a compact disk held by the grasping mechanism.

The storage container may include a lever arm for engaging one of the first and second arms and effecting movement of the engaged arm relative to the non-engaged arm against the bias of the arms toward the first and second locations so that the compact disk may be released. In one embodiment, the grasping mechanism is mounted for rotation relative to the outer casing. In this embodiment, the grasping mechanism may be rotatable between a first position in which a compact disk held by the grasping mechanism is located within the outer casing and a second position in which the grasping mechanism is aligned such that a compact disk held by the grasping mechanism is substantially outside the outer casing. A stop may be provided wherein upon rotation of the grasping mechanism, the second arm contacts the stop and the stop restricts rotation of the second arm about the axis of rotation of the grasping mechanism. A lever arm could be used to contact the first arm when the second arm contacts the stop, the lever arm selectively operable to effect movement of the first arm relative to the second arm against the bias of the arms toward the first and second locations so that the compact disk may be released from the grasping mechanism.

The present invention also provides a storage container for a compact disk, having a first top wall arranged to align substantially parallel to the compact disk when the compact disk is within the storage container and a second bottom wall extending substantially parallel to the first top wall and arranged to extend on the opposite side of the compact disk from the first wall when the compact disk is within the storage container, the first and second wall defining outer edges of the storage container. The container of this embodiment further includes a rotatable sidewall having an axis of rotation configured to extend substantially parallel with the central axis of the disk when the disk is positioned in the storage container. A grasping mechanism is also provided.

The grasping mechanism is attached for rotation with the sidewall, and the sidewall and the grasping mechanism are configurable between a first position in which a compact disk held by the grasping mechanism is located within the outer edges of the storage container and the sidewall is aligned along a portion of the outer edges and a second position in which the grasping mechanism is aligned such that a compact disk held by the grasping mechanism will be substantially outside the outer edges.

The grasping mechanism includes a first arm configured to engage a first location on the compact disk and a second arm configured to engage a second location on the compact disk, the second location spaced from the first location. The first and second arms are biased toward the first and second locations such that when a compact disk is held by the grasping mechanism, the first and second arms hold the compact disk in place. The first and second arms are arranged such that a user may manipulate the arms against the bias of the arms toward the first and second locations so that the compact disk may be released. The container of this embodiment may include a stop for restricting rotation of the second arm about the axis of rotation of the rotatable sidewall. In addition, the sidewall may include a bumper for engaging the first arm, the sidewall operable such that rotation of the sidewall from the first position beyond the second position causes the first arm to engage the stop and the bumper to bias the first arm inward relative to the second arm and thereby release the compact disk.

The present invention also provides a storage container having a grasping mechanism and a release mechanism. The grasping mechanism is designed to hold a compact disk, and the release mechanism is selectively operable by a user, without touching the compact disk, to release the compact disk from the grasping mechanism.

The present invention further provides a mechanism for holding a compact disk. The mechanism includes a first flange configured to engage a first location on the compact disk and a second flange configured to engage a second location on the compact disk, the second location spaced from the first location. The first and second flanges are biased toward the first and second locations such that when a compact disk is held by the first and second arms, the first and second arms hold the compact disk in place. A lever system is provided for selectively moving at least one of the first and second flanges away from the first or second location such that the first and second flanges release the first and second locations on the compact disk and the compact disk is released preferably, the lever system is capable of selective movement by a user without contact with the compact disk.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
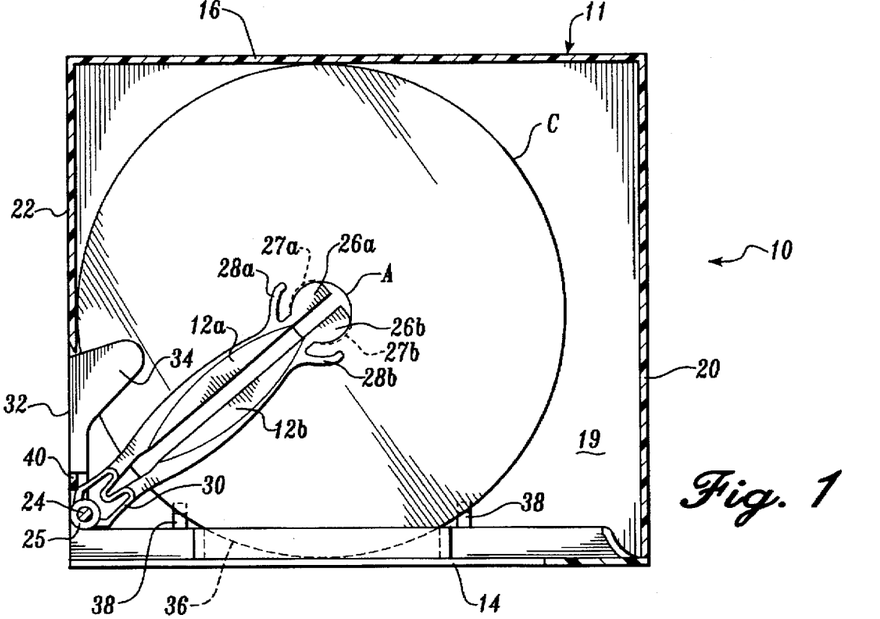
FIG. 1 is a top view of a storage container embodying the present invention, with a compact disk located within the storage container.

Referring now to the drawings, in which like reference numerals represent like parts throughout several views, FIG. 1 sets forth a storage container 10 embodying the present invention. The storage container 10 includes an outer casing 11 in which is received a compact disk C. Although the compact disk C is not necessarily a part of the present invention, for ease of reference parts of the storage container 10 will be explained with reference to the compact disk C being located within or removed from the storage container 10.

Briefly described, the storage container 10 includes a compact disk support in the form of a pair of arms 12a, 12b which grasp the compact disk C and suspend the compact disk C in the storage container. A rotatable sidewall 14 is rotatably mounted to the outer casing 11. Rotation of the rotatable sidewall 14 from the configuration in FIG. 2 to the configuration in FIG. 3 removes the compact disk C from within the outer casing 11. Further rotation of the rotatable sidewall 14 to the configuration in FIG. 4 causes the rotatable sidewall 14 to act as a lever arm and to press the arms 12a, 12b together, releasing the compact disk C.

Figure 5:
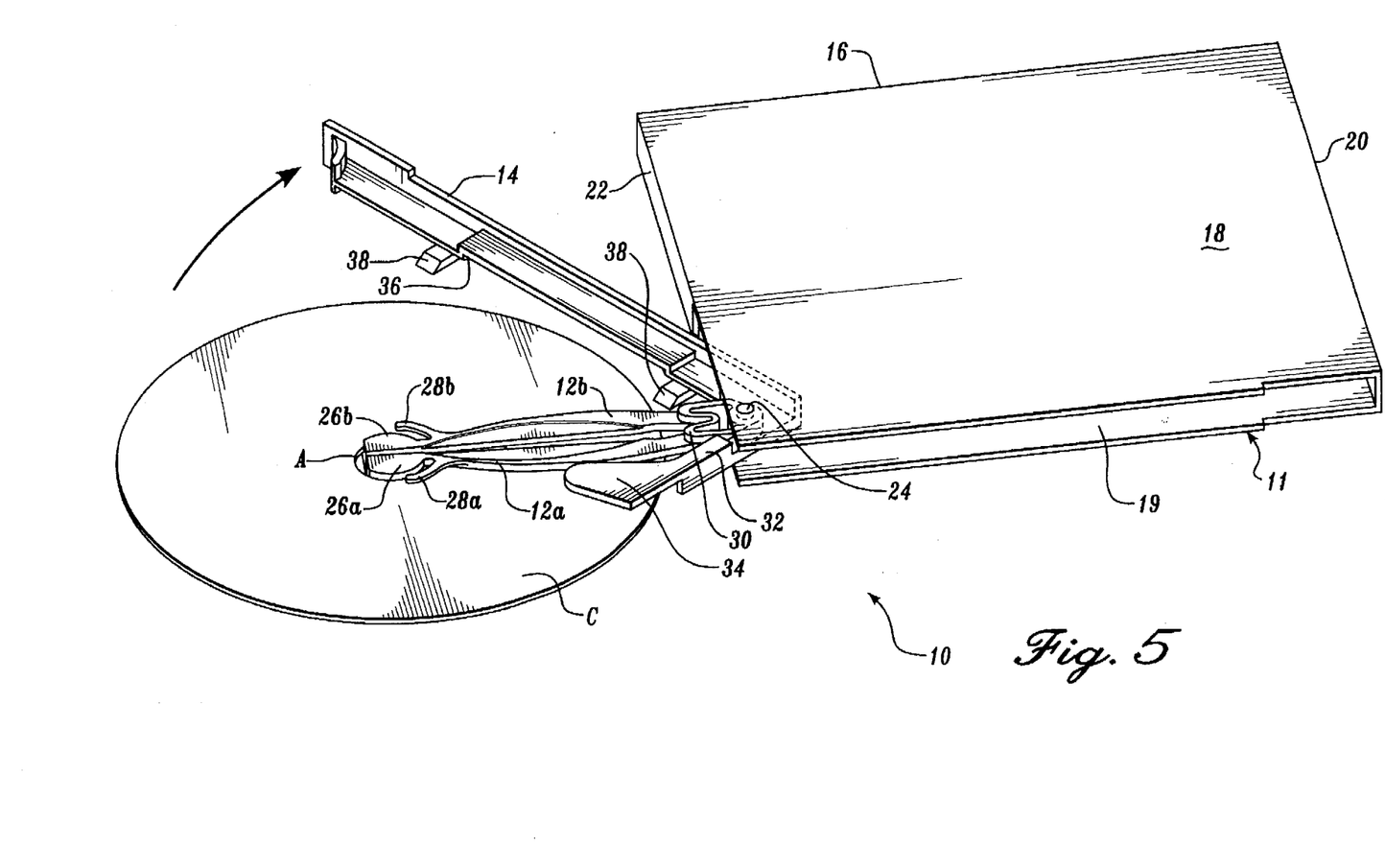
FIG. 5 is a side perspective view of the storage container of FIG. 4.

The outer casing 11 is preferably formed from a single piece of clear plastic and includes a rear edge 16 and a top 18 and a bottom 19 (FIG. 5). The top 18 and the bottom 19 extend substantially parallel to the compact disk C. The outer casing 11 further includes a right side edge 20, and a shortened left side edge 22. The top 18, the bottom 19, the right side edge 20, the rear edge 16, and the shortened left side edge 22 form a five-sided box with an opened sixth side. The rotatable sidewall 14 is rotatably mounted about a pin 24 and is designed such that when rotated against the outer periphery of the top 18 and bottom 19, the rotatable sidewall 14 closes off the sixth side of the box. In this formation, the rotatable sidewall 14, the rear edge 16, and the right and left side edges 20, 22 close the outer perimeter of the top 18 and the bottom 19 such that the compact disk C is completely encased within the outer casing 11 and the rotatable sidewall 14. Thus, the rotatable sidewall 14 selectively closes the outer casing 11.

Figure 4:
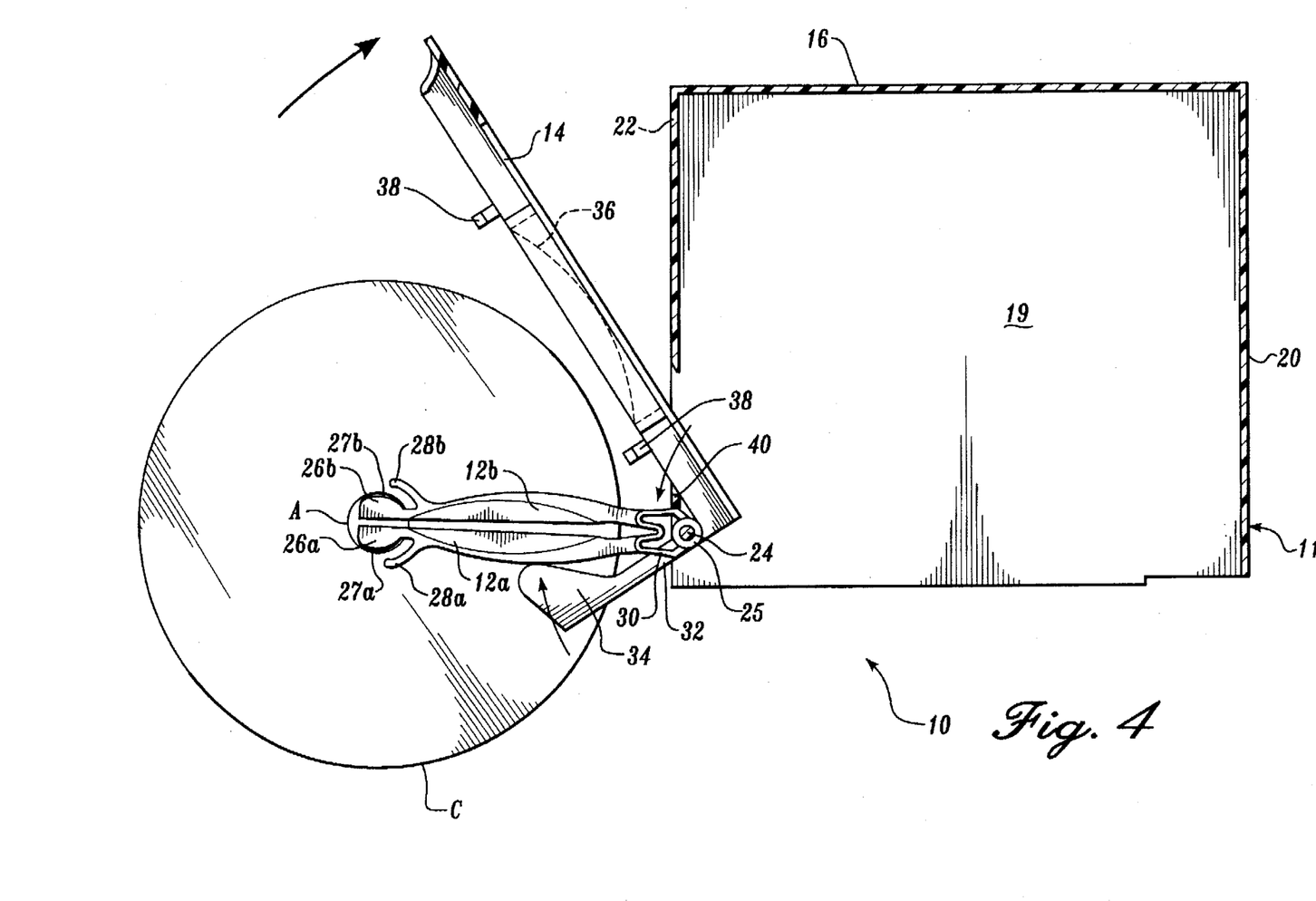
FIG. 4 is a top view of the storage container of FIG. 3 with the lid shown in further rotation such that the rotatable sidewall acts as a lever and presses the arms of the storage container together such as to release the compact disk, the disk shown as just being released.

The pin 24 preferably extends parallel to the central axis of the compact disk C and between the top 18 and bottom 19. The arms 12a, 12b are also rotatably mounted about the pin 24. The two arms 12a, 12b are attached to a central hub 25 through which extends the pin 24. The arms 12a, 12b include flanges 26a, 26b having outwardly extending lips 27a, 27b (FIG. 4). Stabilizing arms 28a, 28b extend outward from the arms 12a, 12b slightly radially inward from the flanges 26a, 26b. A reinforcing section 30 extends between the two arms 12a, 12b and the central hub 25, and establishes the spacing of the two arms.

Figure 6:
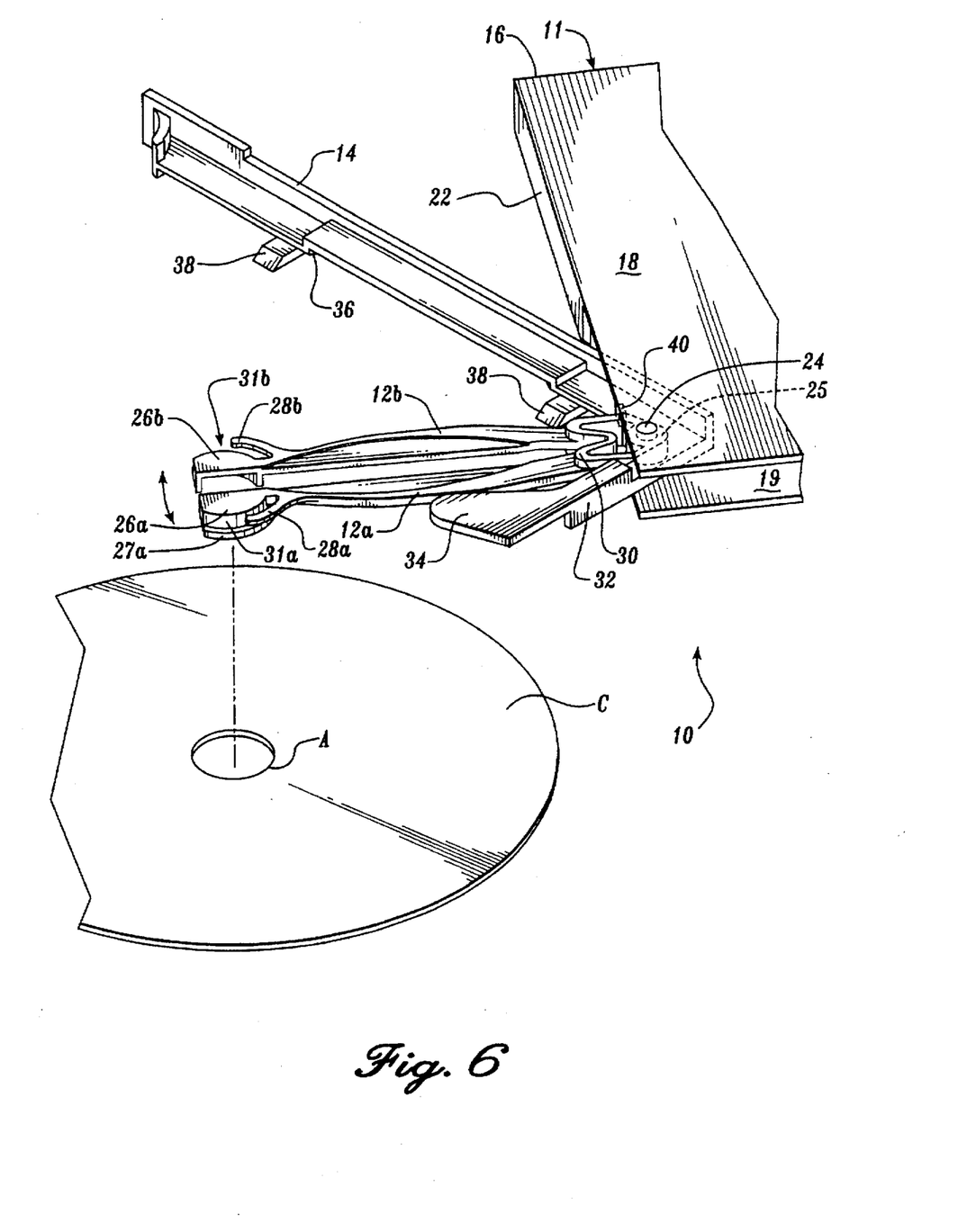
FIG. 6 is a side perspective view of the storage container of FIG. 5, with the compact disk released and the levering action of the lid removed such that the arms are no longer biased together.

The arms 12a, 12b and the reinforcing section 30 are configured such as to bias outwardly facing surfaces 31a, 31b (FIG. 6) of the flanges 26a, 26b against the inner edges of the central aperture A of the compact disk C. The outwardly facing surfaces 31a, 31b are preferably rounded so as to permit the compact disk to rotate slightly as the disk is being released or replaced on the arms 12a, 12b. This configuration enhances the ability of the flanges 26a, 26b to grab the compact disk C from a variety of different angles.

The configuration and structure of the reinforcing section 30 and the arms 12a, 12b cause the arms to define an initial configuration and shape and have a resistance to bending from the original configuration and shape. However, this resistance to bending can be overcome. The arms 12a, 12b and the reinforcing section 30 are flexible such that the arms may be biased inward relative to one another, and are resilient such that they have a tendency to fully recover to the initial shape and configuration after bending. The arms 12a, 12b are preferably flexible to the extent that the arms may be biased inward against the resistance to bending until the flanges 26a, 26b touch, or almost touch preferably, the arms 12a, 12b may be pinched together with relatively little effort by a user. In this inwardly biased position, the central aperture A of the compact disk C may be slipped over the flanges 26a, 26b. The stabilizing arms 28a, 28b prevent the flanges 26a, 26b from being inserted too far into the central aperture A of the compact disk C.

Once the flanges 26a, 26b are within the central aperture A, the arms 12a, 12b are released by the user. The tendency of the arms 12a, 12b to fully recover to their initial shape causes the outwardly facing surfaces 31a, 31b to move against the inside edges of the central aperture A of the compact disk C. preferably, the arms 12a, 12b, the central hub 25, and the reinforcing section 30 are formed in a shape such that the initial shape of the arms biases the flanges 26a, 26b to a position in which the outwardly facing surfaces 31a, 31b are separated by an amount which is slightly larger than the inside diameter of the central aperture A of the compact disk C. Thus, when a compact disk C is on the flanges 26a, 26b, the arms 12a, 12b urge the outwardly facing surfaces 31a, 31b against the internal edges of the central aperture A of the compact disk C such that the flanges hold the compact disk in place. The lips 27a, 27b prevent the compact disk C from sliding off the flanges 26a, 26b. The pressure exerted by the arms 12a, 12b is sufficient such that the flanges 26a, 26b may exert enough pressure to maintain the compact disk C in a stable condition, but is insufficient to damage the internal edges of the central aperture A.

The arms 12a, 12b, the hub 25, and the reinforcing section 30 are preferably molded as one piece. Examples of materials which may be used for these elements are thermoplastic resins such as Acetal, or ABS. However, it will be understood that the arms 12a, 12b, the hub 25, and the reinforcing section 30 may be comprised of any suitable material which exhibits suitable flexibility, resilience, elasticity, resistance to creep and toughness to give a useful flexural fatigue life and to perform the function of the arms 12a, 12b described herein.

The arms 12a, 12b may be somewhat rigid in nature, and all flexibility, resilience, and resistance to bending may be provided within the structure of the reinforcing section 30. Alternatively, the reinforcing section 30 may incorporate a biasing member such as a spring to urge the arms 12a, 12b, and the flanges 26a, 26b outward. However, such an arrangement is not the preferred structure for the arms 12a, 12b, because it requires separate pieces and possibly further expense to construction of the storage container 10 of the present invention. It is to be understood that any number of different arrangements could be provided which provide outwardly facing surfaces which press outward on the central aperture A of a compact disk C so as to support the compact disk. In addition, other embodiments are contemplated in which outer edges of the compact disk C are gripped, or in which an inside edge of the central aperture A and an outer edge of the compact disk are grasped. Other gripping or grasping mechanisms could be used.

The rotatable sidewall 14 is also rotatably mounted about the pin 24 and extends over the central hub 25. The rotatable sidewall 14 includes an extension 32 having a bumper 34, the function of which is described in detail below. A concave indentation 36 (FIG. 2) is included in the rotatable sidewall 14. The concave indentation 36 is designed to engage a portion of the compact disk C when the storage container 10 is in a closed configuration. A pair of retaining flanges 38 are also provided for extending under and stabilizing the compact disk C.

A stop 40 is located just behind the pin 24, and is radially displaced from the pin. The function of the stop 40 is described in detail below.

As shown in FIG. 1, the compact disk C is stored in the outer casing 11 between the flanges 26a, 26b of the arms 12a, 12b. The arms 12a, 12b and the reinforcing section 30 press the outwardly facing surfaces 31a, 31b against the inside edges of the central aperture A of the compact disk C and suspend the compact disk C within the outer casing 11. The lips 27a, 27b prevent the compact disk C from sliding downward off the outwardly facing surfaces. Edges of the compact disk C engage the concave indentation 36 in rotatable sidewall 14, the shortened left side edge 22, and the rear edge 16 of the outer casing 11, maintaining alignment of the compact disk C within the outer casing 11. The retaining flanges 38 also help to maintain alignment of the compact disk C. The compact disk C extends parallel to the top and bottom walls 18, 19. The rotatable sidewall 14, the rear edge 16, and the right side edge 20 enclose three edges of the top 18 and the bottom 19. The extension 32 of the rotatable sidewall 14 and the shortened left side edge 22 enclose the fourth edge of the outer casing 11. In the closed configuration of the storage container 10 shown in FIG. 1, the compact disk C is completely encased between the outer casing 11 and the rotatable sidewall 14.

Figure 2:
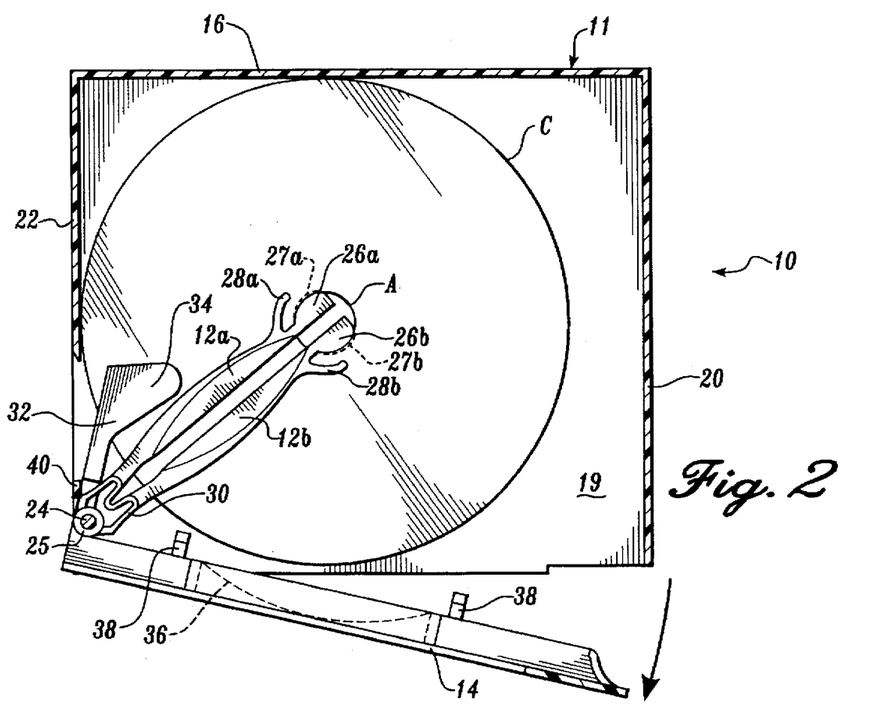
FIG. 2 is a top view of the storage container of FIG. 1, with rotatable sidewall partially opened to initiate removal of the compact disk.
Figure 3:
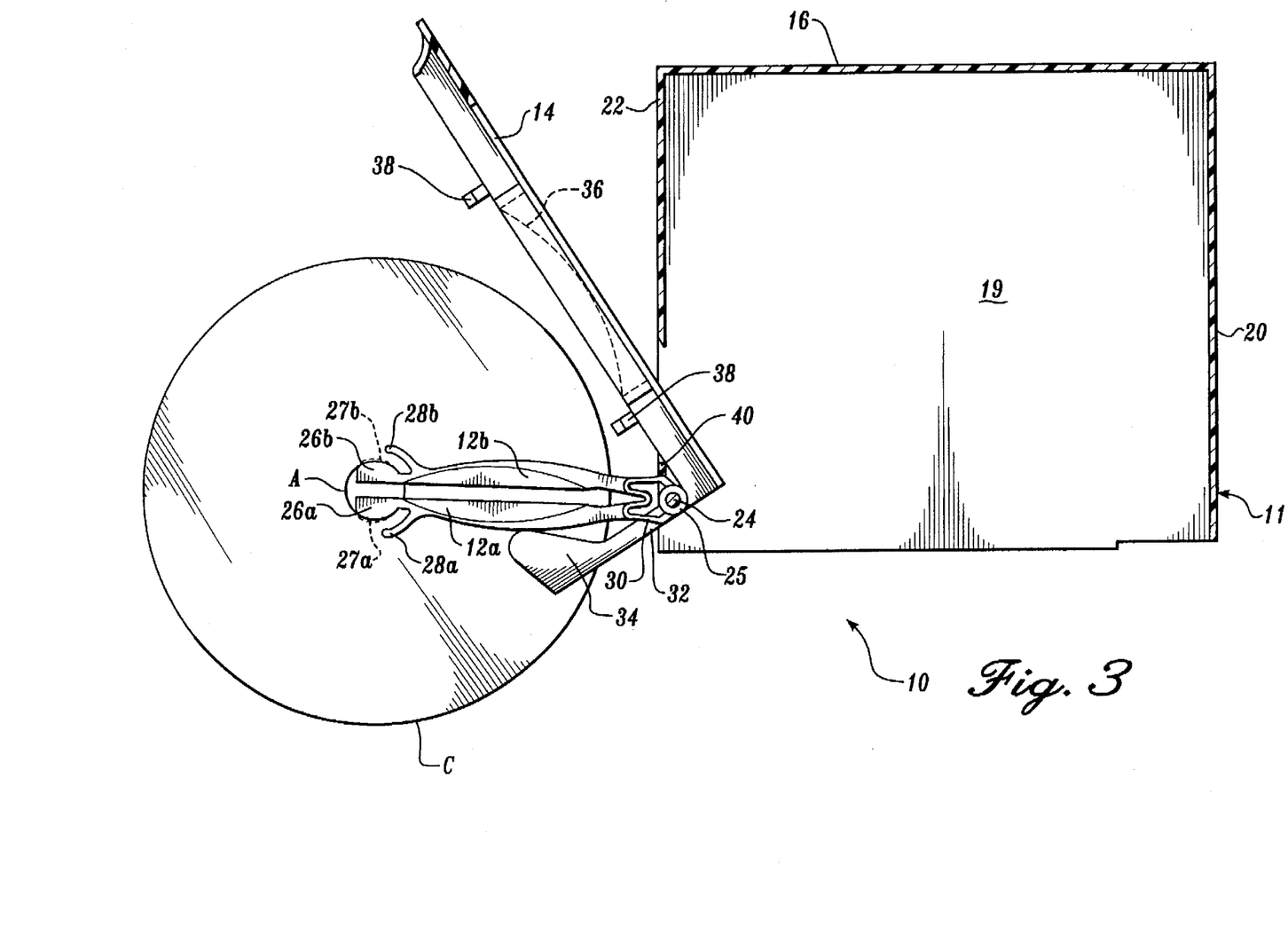
FIG. 3 is a top view of the storage container of FIG. 1 with the rotatable sidewall rotated such that the compact disk is removed from the storage container.

Opening the rotatable sidewall 14 a small amount as is shown in FIG. 2 causes the lid to rotate about the pin 24 and the bumper 34 to engage the first arm 12a. Movement of the rotatable sidewall 14 from the position in FIG. 1 to the position in FIG. 2 is independent of the arms 12a, 12b. Continuing to move the rotatable sidewall 14 in this direction causes the bumper 34 to press the arm 12a and rotates the arms 12a, 12b and the central hub 25 about the pin 24 along with the rotatable sidewall 14. The resistance of the arms 12a, 12b and the reinforcing section to bending prevents this operation from moving the first arm 12a inward relative to the second arm 12b. Continued motion of the rotatable sidewall 14 in this clockwise direction causes the compact disk C to be moved out of the casing 11 (FIG. 3).

Once the compact disk C and the arms 12a, 12b have been moved out of the outer casing 11, the arms 12a, 12b may be squeezed together by the fingers of a user or another biasing piece such that the flanges 26a, 26b approach one another and release the central aperture A of the compact disk C. In this manner, the compact disk C may be released without the user having to touch the compact disk.

The compact disk C may be returned to the storage container 10 by squeezing the arms 12a, 12b together, inserting the flanges 26a, 26b into the central aperture A of the compact disk, and releasing the arms 12a, 12b. The rotatable sidewall 14 may then be rotated in the counter-clockwise direction (FIG. 3) such that the concave indentation 36 of the rotatable sidewall 14 engages an edge of the compact disk. Continued rotation of the rotatable sidewall 14 in this direction encloses the compact disk C within the outer casing 11.

The present invention also provides a unique levering system for even simpler removal of the compact disk C from the storage container 10. By continuing rotation of the rotatable sidewall 14 from the position in FIG. 3 clockwise to the position of FIG. 4, the second arm 12b engages the stop 40, precluding further rotation of the reinforcing section 30 and the second arm 12b. Continued clockwise rotation of the rotatable sidewall 14 forces the bumper 34 of the rotatable sidewall 14 against the first arm 12a. The flexibility of the arms 12a, 12b and the reinforcing section 30 permits the two arms to be biased towards one another by this levering action, drawing the flanges 26a, 26b toward one another. In this manner, the compact disk C is released from the flanges 26a, 26b. The compact disk C may be released as described above onto the compact disk playing surface of a compact disk player.

By using the levering action described above, the compact disk C may be lifted from a surface, such as the playing surface of a compact disk player. The levering action causes the bumper 34 to be pressed against the first arm 12a such that the flanges 26a, 26b are drawn together. The drawn together flanges 26a, 26b may then be inserted in the central aperture A of the compact disk C. Releasing the levering action on the rotatable sidewall 14 allows the arms 12a, 12b to return toward their original shape, causing the flanges 26a, 26b to be urged outward against the edges of the central aperture A of the compact disk C. The compact disk may then be lifted from its position and the storage container 10 may be closed as described above.

The storage container 10 described above offers many advantages over prior art storage containers for compact disks. The flexibility and resiliency of the arms 12a, 12b and the reinforcing section 30 provide stable support, yet permit simple release of the central aperture A of the compact disk C from the storage container 10. In addition, the arrangement of the arms 12a, 12b permits hands-free removal of a compact disk from the storage container 10. The levering action of the rotatable sidewall 14 also provides a one-step movement for removal of the compact disk C from the outer casing 11 and release of the compact disk from the arms 12a, 12b. In addition, the rotatable sidewall 14 permits one-step retrieval of the compact disk C.

While the storage container 10 has been disclosed with respect to an embodiment having both a novel hands-free arrangement for removing a novel compact disk C from an outer casing 11 and a novel compact disk support (the arms 12a, 12b), it will be appreciated that benefits can be obtained by employing either the novel compact disk support system within a conventional compact disk storage container, or by employing the apparatus of releasing a compact disk from the outer casing without the novel compact disk support.

While this invention has been described in detail with particular reference to preferred embodiments thereof, it will be understood that variations and modifications can be affected within the spirit and scope of the invention as described hereinbefore and as defined in the appended claims. In addition, while the storage container has been described as having front, rear, left, right, top, and bottom sides or edges thereof, it is to be understood that the storage container may be used in any orientation and that the recited descriptions are for ease of description only.

The embodiments of the invention in which an exclusive property or privilege is claimed are defined as follows:

1. A storage container for a compact disk, comprising:
an outer casing; and
a grasping mechanism rotatably coupled to the outer casing, the grasping mechanism rotatable relative to the outer casing between a first position in which a compact disk held by the grasping mechanism is located within the outer casing and a second position in which the grasping mechanism is aligned such that a compact disk held by the grasping mechanism is substantially outside the outer casing, the grasping mechanism comprising:
a first arm having a first abutting surface;and
a second arm having a second abutting surface, the first arm and second arms being selectively reconfigurable between:
(1) a first grasping arrangement in which the first abutting surface and the second abutting surface are biased in a first direction and spaced relative to one another a first distance whereby first and second locations on a compact disk may be grasped thereby; and
(2) a second release arrangement in which the first and second abutting surfaces are removed away from the grasping arrangement in a direction that is substantially opposite of the first direction and are spaced a second distance not equal to the first distance, whereby a compact disk grasped in the grasping arrangement may be released.

2. The storage container of claim 1, wherein the first and second abutting surfaces are biased outward relative to one another in the grasping arrangement and the first distance is no less than the width of a central aperture of a compact disk.

3. The storage container of claim 2, wherein the first and second abutting surfaces are biased outward by the first and second arms comprising a flexible, resilient material.

4. The storage container of claim 2, wherein the first abutting surface comprises a first convex flange on its outer face, and the second abutting surface comprises a second convex flange on its outer face, and wherein the first and second convex flanges are configured to match the contour of opposite internal edges of a central aperture of a compact disk.

5. The storage container of claim 4, wherein the first and second convex flanges each comprise a lip at a lower surface of the respective convex flange.

6. The storage container of claim 1, wherein the first and second abutting surfaces each comprise a lip at a lower surface of the respective convex flange.

7. The storage container of claim 1, wherein the first abutting surface extends perpendicularly off of the first arm, and wherein the second abutting surface extends perpendicularly off of the second arm, whereby the first and second arms extend at least partly over a compact disk grasped by the abutting surfaces, and further comprising a stabilization arm extending off of one of the first and second arms in a direction parallel to a plane containing the first and second arms, whereby the stabilization arm limits upward movement of a compact disk held by the abutting surfaces.

8. The storage container of claim 1, further comprising a lever arm for engaging one of the first and second arms and effecting movement of the engaged arm relative to the non-engaged arm so as to move the first and second arms from the first grasping arrangement to the second release arrangement.

9. The storage container of claim 1, wherein the outer casing comprises a top wall, a bottom wall, and a rotatable sidewall, and wherein the grasping mechanism is mounted for rotation with the rotatable sidewall.

10. The storage container of claim 9, wherein the grasping mechanism is mounted for limited rotation relative to the rotatable sidewall.

11. The storage container of claim 9, wherein upon rotation of the rotatable sidewall, the second arm contacts a stop for restricting rotation of the second arm about the axis of rotation of the grasping mechanism.

12. The storage container of claim 11, further comprising a lever arm for contacting the first arm when the second arm contacts the stop, the lever arm selectively operable to effect movement of the first arm relative to the second arm so as to move the first and second arms from the first grasping arrangement to the second release arrangement.

13. A storage container for a compact disk, comprising:
a first top wall arranged to align substantially parallel to a compact disk held within the storage container;
a second bottom wall extending substantially parallel to the first top wall and arranged to extend on the opposite side of a compact disk held within the storage container from the first wall, the first and second walls defining outer edges of the storage container;
a rotatable sidewall having an axis of rotation configured to extend substantially perpendicular to the top wall of the storage container; and
a grasping mechanism attached for rotation with the sidewall, the sidewall and the grasping mechanism configurable between a first position in which a compact disk held by the grasping mechanism is located within the outer edges of the storage container and the sidewall is aligned along a portion of the outer edges and a second position in which the grasping mechanism is aligned such that a compact disk held by the grasping mechanism is substantially outside the outer edges, the grasping mechanism comprising:
a first arm having a first abutting surface; and
a second arm having a second abutting surface, the first arm and second arms being selectively reconfigurable between:
(1) a first grasping arrangement in which the first abutting surface and the second abutting surface are biased in a first direction and spaced relative to one another a first distance whereby first and second locations on a compact disk may be grasped thereby; and
(2) a second release arrangement in which the first and second abutting surfaces are removed away from the grasping arrangement in a direction that is substantially opposite of the first direction and are spaced a second distance not equal to the first distance, whereby a compact disk grasped in the grasping arrangement may be released.

14. The storage container of claim 13, further comprising a stop for restricting rotation of the second arm about the axis of rotation of the rotatable sidewall and wherein the sidewall comprises a bumper for engaging the first arm, the sidewall operable such that rotation of the sidewall from the first position beyond the second position causes the first arm to engage the stop and the bumper to bias the first arm inward relative to the second arm and moves the first and second arms from the first grasping arrangement to the second release arrangement.

15. A storage container for a compact disk, comprising:
a first arm having a first receiving surface extending therealong and a first abutting surface extending perpendicular thereto; and a second arm having a first receiving surface extending therealong and a second abutting surface extending perpendicular thereto, the first arm and second arms being selectively reconfigurable between
- (1) a first grasping arrangement in which the first abutting surface and the second abutting surface are biased in a first direction and spaced relative to one another a first distance whereby first and second locations on a compact disk may be grasped thereby such that the first and second legs extend parallel to and at least partly across a surface of a compact disk held by the abutting surfaces, and the compact disk extends against the first and second receiving surfaces; and
- (2) a second release arrangement in which the first and second abutting surfaces are removed away from the grasping arrangement in a direction that is substantially opposite of the first direction and are spaced a second distance not equal to the first distance, whereby a compact disk grasped in the grasping arrangement may be released.

16. The storage container of claim 15, wherein the first and second abutting surfaces are biased outward relative to one another in the grasping arrangement and the first distance is no less than the width of a central aperture of a compact disk.

17. The storage container of claim 16, wherein the first and second abutting surfaces are biased outward by the first and second arms comprising a flexible, resilient material.

18. The storage container of claim 17, wherein the first abutting surface comprises a first convex flange on its outer face, and the second abutting surface comprises a second convex flange on its outer face, and wherein the first and second convex flanges are configured to match the contour of opposite internal edges of a central aperture of a compact disk.

19. The storage container of claim 18, wherein the first and second convex flanges each comprise a lip at a lower surface of the respective convex flange.

20. The storage container of claim 15, wherein the first and second abutting surfaces each comprise a lip at a lower surface of the respective convex flange.

21. The storage container of claim 15, wherein the first abutting surface extends perpendicularly off of the first arm, and wherein the second abutting surface extends perpendicularly off of the second arm, whereby the first and second arms extend at least partly over a compact disk grasped by the abutting surfaces, and further comprising a stabilization arm extending off of one of the first and second arms in a direction parallel to a plane containing the first and second arms, whereby the stabilization arm limits upward movement of a compact disk held by the first and second arms abutting surfaces.

22. The storage container of claim 15, further comprising a lever arm for engaging one of the first and second arms and effecting movement of the engaged arm relative to the non-engaged arm so as to move the first and second arms from the first grasping arrangement to the second release arrangement.

23. The storage container of claim 15, wherein the storage container comprises a top wall, a bottom wall, and a rotatable sidewall, and wherein the first and second arms are mounted for rotation with the rotatable sidewall.

24. The storage container of claim 23, wherein the first and second arms are mounted for limited rotation relative to the rotatable sidewall.

25. The storage container of claim 23, wherein upon rotation of the rotatable sidewall, the second arm contacts a stop for rotation of the second arm about the axis of rotation of the first and second arms.

26. The storage container of claim 25, further comprising a lever arm for contacting the first arm when the second arm contacts the stop, the lever arm selectively operable to effect movement of the first arm relative to the second arm so as to move the first and second arms from the first gasping arrangement to the second release arrangement.

27. A mechanism for holding a compact disk, comprising:
- a first flange defining a first abutting surface;
- a second flange defining a second abutting surface, the first arm and second arms being selectively reconfigurable between;
  - (1) a first grasping arrangement in which the first abutting surface and the second abutting surface are biased in a first direction and spaced relative to one another a first distance whereby first and second locations on a compact disk may be grasped thereby; and
  - (2) a second release arrangement in which the first and second abutting surfaces are removed away from the grasping arrangement in a direction that is substantially opposite of the first direction and are spaced a second distance not equal to the first distance, whereby a compact disk grasped in the grasping arrangement may be released, and
- a lever rotatable to selectively engage one of the first and second flanges and effecting movement of the engaged flange relative to the non-engaged flange so as to move the first and second flanges from the first grasping arrangement to the second release arrangement.

28. The mechanism of claim 27, wherein the lever system is capable of selective movement by a user without contact with the compact disk.

* * * * *